United States Patent
Zhu et al.

(10) Patent No.: US 11,646,441 B2
(45) Date of Patent: May 9, 2023

(54) SHEAR-THICKENING IMPACT RESISTANT ELECTROLYTE

(71) Applicants: Yu Zhu, Copley, OH (US); Kewei Liu, Copley, OH (US)

(72) Inventors: Yu Zhu, Copley, OH (US); Kewei Liu, Copley, OH (US)

(73) Assignee: The University of Akron, Akron, OH (US)

( * ) Notice: Subject to any disclaimer, the term of this patent is extended or adjusted under 35 U.S.C. 154(b) by 216 days.

(21) Appl. No.: 16/537,724

(22) Filed: Aug. 12, 2019

(65) Prior Publication Data

US 2020/0052323 A1 Feb. 13, 2020

Related U.S. Application Data

(60) Provisional application No. 62/717,292, filed on Aug. 10, 2018.

(51) Int. Cl.
| | |
|---|---|
| *H01M 10/00* | (2006.01) |
| *H01M 10/056* | (2010.01) |
| *H01M 10/0525* | (2010.01) |
| *H01M 10/0567* | (2010.01) |

(52) U.S. Cl.
CPC ..... *H01M 10/056* (2013.01); *H01M 10/0525* (2013.01); *H01M 10/0567* (2013.01); *H01M 2300/0025* (2013.01); *H01M 2300/0037* (2013.01); *H01M 2300/0071* (2013.01); *H01M 2300/0091* (2013.01)

(58) Field of Classification Search
CPC .......... H01M 10/056; H01M 10/0525; H01M 2300/0071; H01M 2300/0037; H01M 2300/0091; H01M 10/0567; H01M 10/052; H01M 2300/0025; Y02E 60/10
See application file for complete search history.

(56) References Cited

U.S. PATENT DOCUMENTS

| | | | | |
|---|---|---|---|---|
| 2009/0004413 | A1* | 1/2009 | Wagner | F16F 9/30 428/34.1 |
| 2010/0035141 | A1* | 2/2010 | Grosvenor | H01M 10/0567 429/129 |
| 2017/0104236 | A1* | 4/2017 | Veith | H01M 10/0569 |

OTHER PUBLICATIONS

Liu et al., "A shear thickening fluid based impact resistant electrolyte for safe Li-ion batteries", Journal of Power Sources 423 (2019) 297-304 (Year: 2019).*
Le et al. "Effect of Nanorod Aspect Ratio on Shear Thickening Electrolytes for Safety-Enhanced Batteries" ACS Appl. Nano Mater. 2018, 1, 6, 2774-2784 (Year: 2018).*
Yu et al. "(Single-ion Polyelectrolyte/ Mesoporous Hollow-Silica Spheres, Composite Electrolyte Membranes for Lithium-ion Batteries" Electrochimica Acta 182 (2015) 297-304 (Year: 2015).*

(Continued)

*Primary Examiner* — Nicholas P D'Aniello
(74) *Attorney, Agent, or Firm* — Renner Kenner Greive, Bobak, Taylor & Weber

(57) ABSTRACT

A shear-thickening electrolyte solution includes a polar solvent; an electrolyte dissolved in said polar solvent; and ceramic filler dispersed in said polar solvent, said ceramic filler having an aspect ratio, length to width, of greater than 1:1 and being functionalized to provide terminal end groups that interact with the polar solvent to form a solvation layer around said ceramic filler and support the suspension of said ceramic filler in said polar solvent.

10 Claims, 2 Drawing Sheets

(56) References Cited

OTHER PUBLICATIONS

Dahbi et al. "Comparative study of EC/DMC LiTFSI and LiPF6 electrolytes for electrochemical storage" Journal of Power Sources vol. 196, Issue 22, Nov. 15, 2011, pp. 9743-9750 (Year: 2011).*
"A shear thickening fluid based impact resistant electrolyte for safe Li-ion batteries", Liu et al., Journal of Power Sources, 423, (2019), 297-304.
"Shear Thickening Electrolyte Built from Sterically Stabilized Colloidal Particles", Shen et al., ACS Appl. Mater. Interfaces, 2018, 10, 9424-9434.
"Shear Thickening Electrolytes for High Impact Resistant Batteries", Veith et al., ACS Energy Lett., 2017, 2, 2084-2088.
"Effect of Nanorod Aspect Ratio on Shear Thickening Electrolytes for Safety-Enhanced Batteries", Ye et al., ACS Appl. Nano Matter., 2018, 1, 2774-2784.

\* cited by examiner

SHEAR-THICKENING IMPACT RESISTANT ELECTROLYTE

CROSS-REFERENCE TO RELATED APPLICATIONS

This application claims priority to U.S. Provisional Application No. 62/717,292 filed Aug. 10, 2018, incorporated herein by reference.

FIELD OF THE INVENTION

The present invention relates to electrolytes. More particularly, this invention relates to shear-thickening electrolytes. Most particularly, this invention relates to functionalized ceramic fillers for use in an electrolyte for imparting shear-thickening properties.

BACKGROUND OF THE INVENTION

Advanced energy storage materials contain a significant amount of energy. If a battery is penetrated, it can lead to an electrical short that spontaneously discharges the battery, thus releasing all the energy at once and causing a significant amount of local heating. When the heating is above the ignition temperature of the aprotic flammable organic electrolyte, the electrolyte will catch on fire causing personnel or property damage.

With the recent utilization of lithium ion batteries in large scale applications such as electrical vehicles, safety concerns have emerged regarding the heavily packed battery energy source. Commercial electrical vehicles require several thousand battery cells installed within each unit. Even though significant efforts have been applied on controlling the thermal management of these batteries, battery fires and explosions are still witnessed in car accidents involving electrical vehicle, which pose significant public safety concerns. In those accidents, the impact induced penetration of liquid electrolytes and their porous polymer separators resulted in internal short-circuiting of the electrolytes, which generate a large amount of heat which eventually cause fire and explosions.

Although replacing the battery call case with a stronger cover is a straightforward way to provide impact protection for the batteries, such a replacement will reduce the energy density of the battery and therefore increase the cost of the battery. Therefore, it is desirable to achieve the impact resistance through replacing existing battery component with alternatives having enhanced mechanical strength. Because the electrolytes in the batteries contribute significant volume to the battery, thus an electrolyte that can provide impact resistance while maintaining the cell function would be an ideal solution to this problem.

A variety of solid electrolytes have been explored as nonflammable electrolytes having high mechanical strength. Although many of these alternatives are potentially promising, current solid electrolytes are either less conductive as conventional electrolytes, or they have a relatively narrow electrochemical window. In addition, the cell fabrication processes with solid electrolytes still face many challenges, due to the large interfacial resistance between the electrode materials and the electrolytes. This, there is still a need in the art for a solid electrolyte that can be used to replace the commercial liquid electrolyte while providing for impact resistance.

SUMMARY OF THE INVENTION

A first embodiment provides a shear-thickening electrolyte solution comprising: a polar solvent; and electrolyte dissolved in said polar solvent; and ceramic filler dispersed in said polar solvent, said ceramic filler having an aspect ratio, length to width, of greater than 1:1 and being functionalized to provide terminal end groups that interact with the polar solvent to form a solvation layer around said ceramic filler and support the suspension of said ceramic filler in said polar solvent.

A second embodiment provides a shear-thickening electrolyte solution as in the first embodiment wherein the ceramic filler is functionalized by reaction with a functionalizer of Formula 1: $R^1{}_n$—Si—O—$R^2$—$R^3$, wherein $R^1$ is a alkoxy end group, n is a numeral from 1 to 3, $R^2$ is a carbon chain containing from 3 to 24 carbons, and $R^3$ is a polar terminal end group.

A third embodiment provides a shear-thickening electrolyte solution as in any of the first or second embodiments wherein $R^2$ is a carbon chain containing from 3 to 6 carbons.

A fourth embodiment provides a shear-thickening electrolyte solution as in any of the first through third embodiments wherein Formula 1 is (3-aminopropyl) triethoxysilane.

A fifth embodiment provides a shear-thickening electrolyte solution as in any of the first through fourth embodiments wherein the ceramic filler is hollow.

A sixth embodiment provides a shear-thickening electrolyte solution as in any of the first through fifth embodiments wherein the ceramic filler has an aspect ratio great than 5:1.

A seventh embodiment provides a shear-thickening electrolyte solution as in any of the first through sixth embodiments wherein the aspect ratio is between 5:1 and 10:1.

A eighth embodiment provides a shear-thickening electrolyte solution as in any of the first through seventh embodiments wherein the functionalized ceramic filler is selected from the group consisting of glass, silica, $CaCO_3$, $MoS_2$, graphene and its derivatives, $Al_2O_3$, BN and its derivatives, and combinations thereof.

A ninth embodiment provides a shear-thickening electrolyte solution as in any of the first through eighth embodiments wherein the volume fraction of functionalized ceramic filler in the shear-thickening composition is 5% or greater.

A tenth embodiment provides a shear-thickening electrolyte solution as in any of the first through ninth embodiments wherein the volume fraction of functionalized ceramic filler in the shear-thickening composition is 20% or greater.

An eleventh embodiment provides a shear-thickening electrolyte solution as in any of the first through tenth embodiments wherein the polar solvent is a carbonate; wherein the electrolyte is a lithium based salt; wherein the ceramic filler is selected from the group consisting of glass, silica, $CaCO_3$, $MoS_2$, graphene and its derivatives, $Al_2O_3$, BN and its derivatives, and combinations thereof; wherein the ceramic filler in present in the shear-thickening composition at a volume fraction of from 1% or more and 50% or less; and wherein the ionic conductivity of the shear-thickening composition is from 0.01 mS/Cm to 20 mS/cm.

A twelfth embodiment provides a shear-thickening electrolyte solution as in any of the first through eleventh embodiments wherein the carbonate is selected from the group consisting of ethylene carbonate, dimethyl carbonate, ethylmethyl carbonate, propylene carbonate and mixtures thereof.

A thirteenth embodiment provides a shear-thickening electrolyte solution as in any of the first through twelfth embodiments wherein the electrolyte is selected from the group consisting of lithium hexafluorophosphate ($LiPF_6$), lithium bis(oxalato)borate, lithium bis(trifluoromethanesulfonyl)imide, and mixtures thereof.

DETAILED DESCRIPTION OF ILLUSTRATIVE EMBODIMENTS

Figure 1:
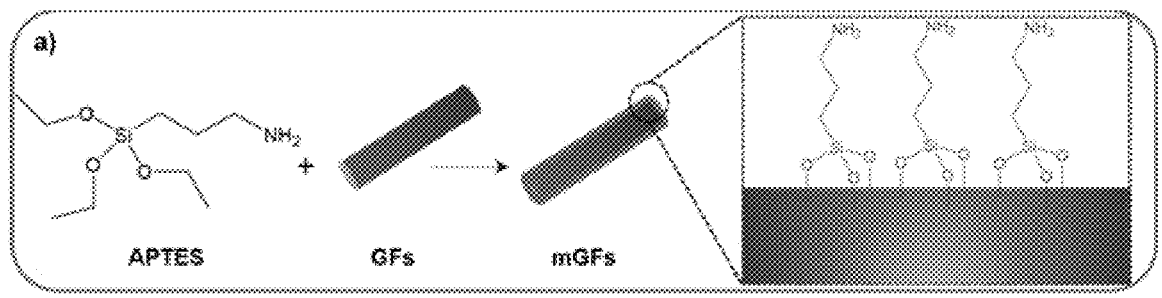
FIG. 1. is a schematic diagram illustrating functionalization of ceramic fillers.

The present invention provides a shear-thickening electrolyte solution including an polar solvent having an electrolyte dissolved therein, and ceramic fillers dispersed therein. The ceramic fillers have an aspect ratio, length to width, of greater than 1, and are functionalized to provide terminal end groups that interact with the electrolyte to form a solvation layer around the ceramic filler and support the suspension of the ceramic fillers in the polar solvent. Upon application of a shear force to the shear-thickening electrolyte solution, the ceramic fillers interact to impart a shear-thickening property wherein the viscosity of the solution increases upon the application of sufficient shear force. The shear-thickening electrolyte may be useful in electrochemical cells and batteries among other applications.

Electrolyte Solution

The electrolyte solution includes a polar solvent and electrolyte dissolved in the polar solvent. Herein, the electrolyte solution can be virtually any useful electrolyte solution, and, in some embodiments, is an electrolyte solution useful in electrochemical cells. These will be well known to those of skill in the art, and typically consist of a polar solvent and salts. In some embodiments, the polar solvent is selected from, ethylene carbonate, dimethyl carbonate, ethylmethyl carbonate, propylene carbonate and mixtures thereof.

In some embodiments, the electrolyte is selected from lithium based salts. Lithium based salts include, without limitation, lithium hexafluorophosphate ($LiPF_6$), lithium bis(oxalato)borate, lithium bis(trifluoromethanesulfonyl)imide, and mixtures thereof.

Filler

Aspect Ratio

The ceramic fillers are characterized by having an aspect ratio, length to width of greater than 1. In one or more embodiments, the aspect ratio is greater than 1:1, in other embodiments greater than 2:1, in other embodiments greater than 3:1, in other embodiments greater than 4:1, in other embodiments greater than 5:1, and, in other embodiments greater than 6:1. While the aspect ratio may be higher in accordance with this invention, in some embodiments, the aspect ratio is less than 15:1, in other embodiments less than 14:1, in other embodiments, less than 13:1, in other embodiments less than 12:1, in other embodiments, less than 11:1, and, in other embodiments, less than 10:1.

In one or more embodiments, the aspect ratio is from 1:1 to 15:1, in other embodiments, from 2:1 to 14:1, in other embodiments, from 3:1 to 13:1, in other embodiments, 4:1 to 12:1, and, in yet other embodiments from 5:1 to 11:1, and, in other embodiments, from 5:1 to 10:1.

Length

In some embodiments, the length of the ceramic fillers is in the micro scale. In some such embodiments, the length of the ceramic fillers is less than 100 μm, in some embodiments, less than 70 μm, in some embodiments, less than 50 μm, in some embodiments, less than 25 μm, in some embodiments, less than 10 μm, in some embodiments, less than 5 μm, and in yet other embodiments, less than 1 μm.

In some embodiments, the length of the ceramic fillers is in the nanoscale. In some such embodiments, the length of the ceramic filers is less than 1 μm, in some embodiments, less than 750 nm, in some embodiments, less than 500 nm, in some embodiments, less than 250 nm, in some embodiments, less than 100 nm, in some embodiments, less than 50 nm.

In some embodiments, the ceramic fillers are in the micro scale and have lengths of between 1 and 100 μm. In other such embodiments, the ceramic fillers have lengths of between 1 and 70 μm, in other embodiments between 1 and 50 μm, in other embodiments between 1 and 25 μm. In some embodiments, the ceramic fillers are in the nanoscale and have lengths of between 50 nm and 750. In other such embodiments, the ceramic fillers have lengths of between 50 and 500 nm Filler Materials In one or more embodiments, the ceramic filler is selected from glass, silica, calcium carbonate ($CaCO_3$), $MoS_2$, $Al_2O_3$, graphene and derivatives, boron nitride and derivatives, and mixtures thereof. In some embodiments, the ceramic filler is glass fiber.

In some embodiments, the ceramic fillers are solid or rod-like. In some embodiments, the ceramic fillers are hollow or tube-like.

In some embodiments, the ceramic filler is glass fiber. In one or more embodiments, suitable ceramic fillers are glass fibers such as those obtained from membranes such as Whatman® microfiber filters 1823-257.

In some embodiments, the ceramic fillers are silica nanotubes. In one or more embodiments, suitable ceramic fillers are silica nanotubes fabricated by template synthesis-providing a template, coating/depositing ceramic material on the surface of the template, and then removing the template.

In one or more embodiments, nanotube synthesis includes providing a nickel-hydrazine template, coating the template with a ceramic precursor, and removing/eliminating the nickel-hydrazine template.

A ceramic precursor is a molecule that is coated/deposited on the template. In one or more embodiments the template is removed, and this yields a hollow ceramic filler. In one or more embodiments, the ceramic precursor is tetraethyl orthosilicate (TEOS), in other embodiments it is tetramethoxysilane.

In one or more embodiments, creating a nickel-hydrazine template includes combining a surfactant and non-polar solvent, and then adding a nickel salt dropwise. In one or more embodiments the surfactant is polyethylene glycol monocetyl ether, also known as Brij $C_{10}$.

In one or more embodiments coating the nickel-hydrazine template includes adding diethylamine and tetraethyl orthosilicate.

In one or more embodiments, the nickel-hydrazine template is removed by chemical dissolution. The removal of the template creates a hollow silica filler. In one or more embodiments, the chemical dissolution is performed with hydrochloric acid.

Functionalization

It is again noted the ceramic fillers are functionalized to provide terminal end groups that interact with the electrolyte to form a solvation layer around the ceramic filler and support the suspension of the ceramic fillers in the polar solvent. Thus, in polar solvents such as carbonates, the ceramic fillers can be provided with terminal end groups such as amines, hydroxyl groups, carbonyl groups, thiol groups, and carboxylic acid groups.

In one or more embodiments, the ceramic fillers are functionalized to have terminal end groups by reaction with a functionalizer. In some embodiments, the functionalizer may be define by Formula 1:

$$R^1_n\text{—Si—}R^2\text{—}R^3 \qquad \text{Formula 1}$$

wherein $R^1$ is an alkoxy end group, n is 1 to 3, $R^2$ is a carbon chain from 3 to 24 carbons, and $R^3$ is a polar terminal end group.

In one or more embodiments, the Si in Formula 1 may have one alkoxy substituent, in other embodiments, two alkoxy substituents, and, in other embodiments, three alkoxy substituents. This is denoted by n in Formula 1 being from 1 to 3. In one or more embodiments, $R^1$ is ethoxy ($H_5C_2O$—) and, in yet other embodiments, $R^1$ is ethoxy ($H_5C_2O$—) and n=3.

In one or more embodiments, $R^2$ may be hydrocarbyl groups, which include, but not limited to, alkyl, cycloalkyl, alkenyl, cycloalkenyl, aryl, allyl, aralkyl, alkaryl, or alkynyl groups. Hydrocarbyl groups also include substituted hydrocarbyl groups, which refer to hydrocarbyl groups in which one or more hydrogen atoms have been replaced by a substituent such as a hydrocarbyl group. These groups may or may not contain heteroatoms. Suitable heteroatoms include, but are not limited to, nitrogen, boron, oxygen, silicon, sulfur, tin, and phosphorus atoms. In one or more embodiments, the cycloalkyl, cycloalkenyl, and aryl groups are non-heterocyclic groups. In these or other embodiments, the substituents forming substituted hydrocarbyl groups are non-heterocyclic groups. In one or more embodiments, the monovalent organic group may be straight-chain or branched. In one or more embodiments $R^2$ includes a carbon chain of from 3 to 18 carbons, in other embodiments, 3 to 12 carbons, in other embodiments 3 to 6 carbons, and still in other embodiments is 3 carbons.

In one or more embodiments $R^3$ is selected from amines, hydroxyl groups, carbonyl groups, thiol groups, and carboxylic acid groups. These are particularly useful for polar solvents having carbonates.

In one or more embodiments the functionalizer is (3-aminopropy) triethoxysilane (APTES).

$$(H_5C_2O)\text{—Si—}CH_2\text{—}CH_2\text{—}CH_2\text{—}NH_2$$

It will be appreciated that the silane-based alkoxy end group $R^1$ can readily bond to the hydroxyl groups generally present on ceramic fillers, such as those described herein. The amine terminal group can interact with solvent molecules such as ethylene carbonate (EC) and dimethyl carbonate (DMC) and form a solvation layer around glass fibers modified with this compound. The functionalization of a glass fiber with APTES is shown in FIG. 1, where GF stands for glass fiber and mGF stands for modified glass fiber.

In one or more embodiments, ceramic filler is functionalized by reaction with APTES by mixing toluene, APTES, and the ceramic filler in solution at an elevated temperature for excess time. For example, the reaction can be carried out at 70° C. and overnight.

Creating Shear-Thickening Electrolyte Solution

Simple Mixing Procedure

The shear-thickening electrolyte solution is made by mixing the functionalized ceramic filler with the electrolyte solution of polar solvent containing electrolyte. The filler is added and mixed and, due to the functionalization as described herein, the ceramic filler is suspended in the electrolyte solution. The presence of the ceramic filler imparts shear-thickening properties, and thus the resulting solution is termed a shear-thickening electrolyte solution.

Volume Percent Loading

In one or more embodiments, the shear-thickening electrolyte has a ceramic filler volume fraction greater than 5%. In other embodiments, the shear-thickening electrolyte has a ceramic filler volume fraction greater than 10%, in other embodiments, greater than 15%, in other embodiments, greater than 30%, in other embodiments, greater than 40%, in other embodiments, greater than 45%, and, in other embodiments, greater than 50%.

In one or more embodiments, the shear-thickening electrolyte has a ceramic filler volume fraction less than 5%. In other embodiments, the shear-thickening electrolyte has a ceramic filler volume fraction less than 10%, in other embodiments, less than 20%, in other embodiments, less than 30%, in other embodiments, less than 40%, in other embodiments, less than 45%, and, in other embodiments, less than 50%.

In one or more embodiments, the shear-thickening electrolyte has a ceramic filler volume fraction from about 5% to 50%, in other embodiments, from about 5% to 45%, in other embodiments, from about 5% to 40%, in other embodiments, from about 5% to 30%, in other embodiments, from about 5% to 15%.

Properties

In one or more embodiments, the shear-thickening electrolyte has an ionic conductivity from about 0.01 mS/cm to 20 mS/cm, in other embodiment it has an ionic conductivity from about 1 mS/cm to 20 mS/cm, in other embodiment it has an ionic conductivity from about 3 mS/cm to 20 mS/cm, in other embodiment it has an ionic conductivity from about 5 mS/cm to 20 mS/cm, in other embodiment it has an ionic conductivity from about 7 mS/cm to 20 mS/cm, in other embodiment it has an ionic conductivity from about 9 mS/cm to 20 mS/cm, in other embodiment it has an ionic conductivity from about 15 mS/cm to 20 mS/cm, and still in other embodiment it has an ionic conductivity from about 18 mS/cm to 20 mS/cm.

In one or more embodiments, shear-thickening was observed in a shear-thickening electrolyte at shear rate greater than 5 s$^{-1}$, in another embodiment shear-thickening was observed in a shear-thickening electrolyte at shear rate greater than 20 s$^{-1}$, in another embodiment shear-thickening was observed in a shear-thickening electrolyte at shear rate greater than 35 s$^{-1}$, in another embodiment shear-thickening was observed in a shear-thickening electrolyte at shear rate greater than 50 s$^{-1}$, in another embodiment shear-thickening was observed in a shear-thickening electrolyte at shear rate greater than 65 s$^{-1}$, in another embodiment shear-thickening was observed in a shear-thickening electrolyte at shear rate greater than 80 s$^{-1}$, in another embodiment shear-thickening was observed in a shear-thickening electrolyte at shear rate greater than 95 s$^{-1}$, in another embodiment shear-thickening was observed in a shear-thickening electrolyte at shear rate greater than 110 s$^{-1}$, in another embodiment shear-thickening was observed in a shear-thickening electrolyte at shear rate greater than 125 s$^{-1}$, in another embodiment shear-thickening was observed in a shear-thickening electrolyte at shear rate greater than 140 s$^{-1}$, in another embodiment shear-thickening was observed in a shear-thickening electrolyte at shear rate greater than 200 s$^{-1}$, in another embodiment shear-thickening was observed in a shear-thickening electrolyte at shear rate greater than 300 s$^{-1}$, and still in another embodiment shear-thickening was observed in a shear-thickening electrolyte at shear rate greater than 500 s$^{-1}$.

As seen in the experimental herein, in one or more embodiments, shear-thickening was observed in a shear-thickening electrolyte with ceramic filler volume fraction of 28.6% at shear rate greater than 95 s$^{-1}$, in other embodiments shear-thickening was observed in a shear-thickening electrolyte with ceramic rod volume fraction of 32.9% at shear rate greater than 85 s$^{-1}$, in other embodiments shear-thickening was observed in a shear-thickening electrolyte with ceramic filler volume fraction of 37.5% at shear rate greater than 40 s$^{-1}$, in other embodiments shear-thickening was observed in a shear-thickening electrolyte with ceramic filler volume fraction of 42.4% at shear rate greater than 25 s$^{-1}$, in other embodiments shear-thickening was observed in a shear-thickening electrolyte with ceramic filler volume fraction of 47.7% at shear rate greater than 10 s$^{-1}$.

In one or more embodiments, the ionic conductivity of a shear-thickening electrolyte with ceramic filler volume fraction of 28.6% is 8.3 mS/cm, in another embodiment the ionic conductivity of a shear-thickening electrolyte with ceramic filler volume fraction of 32.9% is 8.0 mS/cm, in another embodiment the ionic conductivity of a shear-thickening electrolyte with ceramic filler volume fraction of 37.5% is 6.9 mS/cm, in another embodiment the ionic conductivity of a shear-thickening electrolyte with ceramic filler volume fraction of 42.4% is 6.2 mS/cm, in another embodiment the ionic conductivity of a shear-thickening electrolyte with ceramic filler volume fraction of 47.7% is 5.7 mS/cm.

In one or more embodiments the shear-thickening electrolyte maintains shear-thickening as temperature elevates. In one or more embodiments, shear-thickening was observed in a shear-thickening electrolyte with ceramic filler volume fraction of 37.5% at shear rate of 11 s$^{-1}$ at 25° C.; in this embodiment, when the temperature is raised to 45° C., the shear rate to require to trigger shear-thickening is 28 s$^{-1}$.

The excellent electrochemical stability and impact-resistance nature of the shear-thickening electrolytes of the present invention enable them to be used as a potential candidate to replace the commercial electrolyte so as to be able to protect batteries from short circuits under severe impact. The shear-thickening electrolyte can be used in electrochemical cells in a similar manner to that of normal electrolytes. Additionally, the shear-thickening electrolyte can be used with graphite, LTO, NMC, NCA, LFP, and LMN electrodes.

In some embodiments, an electrochemical cell using the shear-thickening electrolyte will exhibit a smother anode surface after cycling. This is likely because the ceramic fillers increase to tortuosity of lithium transport passageways, which creates a more uniform deposition of lithium ions relative to an electrochemical cell using normal electrolyte. This is beneficial for batteries with lithium metal as anode. The smooth deposition of lithium could avoid the formation of dendritic structure, minimize the issue of internal short circuit.

In light of the foregoing, it should be appreciated that the present invention significantly advances the art by providing a shear-thickening electrolyte that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

EXAMPLES

In order to demonstrate practice of the invention, the following examples are offered to more fully illustrate the invention, but are not to be construed as limiting the scope thereof. Further, while some of examples may include conclusions about the way the invention may function, the inventors do not intend to be bound by those conclusions, but put them forth only as possible explanations. Moreover, unless noted by use of past tense, presentation of an example does not imply that an experiment or procedure was, or was not, conducted, or that results were, or were not actually obtained. Efforts have been made to ensure accuracy with respect to numbers used (e.g., amounts, temperature), but some experimental errors and deviations may be present. Unless indicated otherwise, parts are parts by weight, molecular weight is number average molecular weight, temperature is in degrees Centigrade, and pressure is at or near atmospheric.

Preparation of APTES Modified Glass Fiber Pillars

A 5 g glass fiber membrane was ball-milled for 35 minutes to obtain glass fiber pillars. To a suspension of 4 g glass fiber pillars in 6 ml anhydrous toluene, 0.4 ml APTES was added was stirring at 70° C. overnight. The suspension was then washed with methanol for three times via centrifugation. The sediment was collected and dried at 80° C. for 5 hours to recover 3.65 g APTES-modified glass fiber pillars.

Preparation of the Shear-Thickening Electrolyte

The shear-thickening electrolytes were prepare by mixing APTES-modified glass fiber pillars with 1M LiPF$_6$ in an EC/DMC electrolyte solution in an Argon filled glovebox following the indicated volume fractions. For instance, to prepare the shear-thickening electrolyte with a filler volume fraction of 37.5%, 1.6 g APTES-modified glass fiber pillars were suspended in 1 ml 1M LiPF$_6$ in an EC/DMC electrolyte solution, which was then sealed in a 4 ml vial inside an Argon filled glovebox. A stable suspension solution was obtained after ultra-sonication for 20 minutes in a bath sonicator. In other embodiments, the sonication step could be conducted outside the glovebox if the vial was completely sealed during the sonication.

Battery Fabrication

Coin cells were assembled in the glovebox with oxygen and a water content below 0.5 ppm. For half-cell tests, LFP slurry was prepared by mixing active material (80% wt), Super P (10% wt), PVDF (10% wt) and NMP. The as-prepared slurry was casted on to copper foil with a doctor blade and then dried at 80° C. overnight. The coated electrode was then punched into disks with a diameter of ½ inch. The active material mass loading is 1.8 mg/cm2. Lithium metal foil was used as a counter electrode. For full cell fabrication, an LTO (MTI) electrode with a mass loading of 11 mg/cm2 and an LFP (MTI) electrode with a mass loading of 11.5 mg/cm2 g were used as anode and cathodes. Two pieces of Celgard (3501) membranes were employed as the separator for all batteries. 1 M LiPF6 in EC/DMC was utilized as the reference liquid electrolyte. For the shear-thickening electrolytes, 1 M LiPF6 in EC/DMC with 37.5% (volume fraction) modified GF fillers were used. For comparison purposes, 1 M LiPF6 in EC/DMC with 37.5% (volume fraction) unmodified GF fillers were prepared and tested as well. Pouch cells were fabricated by using LTO (MTI) electrodes with a mass loading of 11 mg/cm2 and LFP (MTI) electrodes with a mass loading of 11.5 mg/cm2 g. The size of the electrode was 5.8 cm×4.5 cm. Aluminum tabs and nickel tabs were welded as current collectors for the cathode and anode, respectively. Both cathode and anode were wrapped by a separator. Commercial pouch cell cases (MTI) were used to seal the electrodes. Three sides of the pouch cell case were sealed in advance and vacuum sealing was carried out for the last side after the electrolyte injection in the Argon filled glove box. For pouch cells, only reference liquid electrolytes (1 M LiPF6 in EC/DMC) and shear-thickening electrolytes (1 M LiPF6 in EC/DMC with 37.5% (volume fraction) modified GF fillers) were used.

Results and Discussion:

Preparation of the Shear-thickening Electrolyte

Shear-thickening fluid is a stabilized suspension, in which the particles are stabilized by interparticle forces that can be described by the Hamaker theory. To support the formation of a stabilized suspension, surface functionalization of filler particles is necessary due to the weak interparticle force of inorganic particles ($\sim 10^{-10}$ N). The dispersion of solid particles in organic LIB electrolytes is even more challenging due to the complicated electrolyte composition with different organic solvents, lithium salts and additives. Under this scenario, solvent effects, electrostatic repulsion, and interparticle forces all contribute to the formation of a stable suspension. In addition, the ionic conductivity will be affected by filler volume fraction.

In embodiments of the present invention, glass fiber (Whatman® microfiber filters 1823-257) were used as the filler source. The fiber mat was cut into small pieces and then ball-milled. The resulting glass fiber powder consisted of short pillars with an aspect ratio of 5-10. To functionalize the glass fiber pillars, the materials were treated with (3-aminopropyl)triethoxysilane (APTES) in anhydrous toluene. As shown in FIG. 1, the functionalized glass fibers (mGFs) have amine ending group which can interact with solvent molecules such as ethylene carbonate (EC) and dimethyl carbonate (DMC), and form solvation layers around the mGFs. A scanning electron microscope was used to characterize the morphology of the mGFs and showed that the mGFs of the present invention have similar aspect ratios as the non-functionalized glass fibers. The diameters of the mGFs varied from a few hundreds of nanometers to several microns. The formulated electrolyte (37.5% of mGFs in 1M LiPF6 EC/DMC) formed a stable suspension.

Electrolyte Characterization

Figure 2:
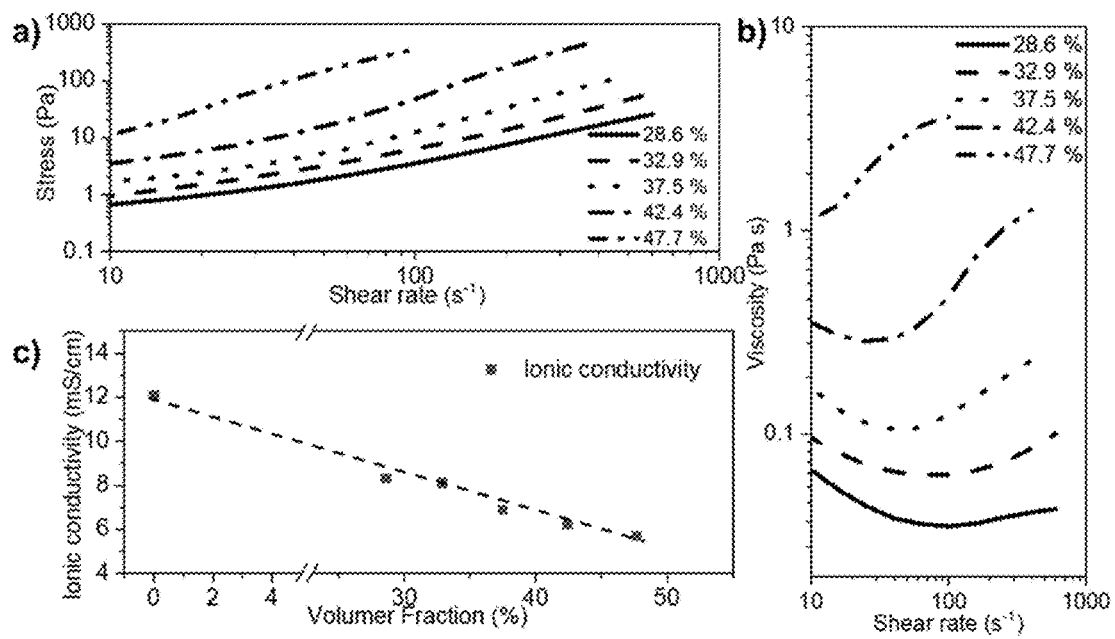
FIG. 2 provides three graphs of data from the experimental section, wherein part a) provides the shear stress as a function of shear rate for electrolytes with varied filler volume fractions; part b) provides shear viscosity as a function of shear rate for electrolytes with varied filler volume fractions; and part c) provides ionic conductivities vs. volume fractions of shear-thickening electrolyte.

The rheological behaviors of the mGFs supported electrolyte were investigated by using a rotating cone-plate rheometer (TA Instruments ARES-G2) with a gap of 0.2 mm. The dynamic stress and viscosity were measured at different shear rates for samples having different filler loading. As shown in FIG. 2, part a), in the high shear rate region, the electrolytes exhibited dilatant behavior, with the slopes of shear stress/shear rate increasing with shear rate. The lowest filler loading was 28.6% (volume %), where the dilatant behavior was still observed. In FIG. 2, part b), the viscosity of the electrolyte was plotted with shear-rate and most electrolytes, except the ones with the highest filler loading, exhibited shear thinning behavior at a low shear rate before the critical shear rate was achieved. The initial shear thinning phenomena is attributed to thermodynamic Brownian motion. When the shear rate is higher than the critical value, the viscosity increases continuously, indicating a possible hydrodynamically domination regime.

The shear thinning region was not observed for the sample in the shear rate range with the highest filler loading (47.7%), instead, a shear-thickening behavior was directly observed. The critical shear rates, where the suspension transitioned from a shear thinning behavior to shear-thickening behavior, were found to vary with the filler volume fractions: the critical shear rates were 95 $s^{-1}$, 85 $s^{-1}$, 40 $s^{-1}$, 25 $s^{-1}$, and 10 $s^{-1}$ for the filler volume fraction of 28.6% to 32.9%, 37.5%, 42.4%, and 47.7%, respectively. The results suggested that mGFs based shear-thickening electrolytes could be engineered for various application based on the requirements. In contrast, rheology characterizations were also performed with a regular electrolyte and an electrolyte with 37.5% unmodified glass fibers. A typical shear-thinning phenomenon was observed on both cases, suggesting the surface functionalization of the glass fibers is critical for achieving the shear-thickening behavior of the formulated electrolytes. The temperature effect on the dilatant behavior of the impact resistant electrolyte was also studied. The critical shear rate was slightly shifted from 11 $s^{-1}$ to 28 $s^{-1}$ with an increase of temperature from 25° C. to 45° C. The results suggested that the shear-thickening electrolytes of the present invention could be used in a wide temperature range.

The ionic conductivities of the electrolyte with different filler loading were measured by using impedance spectroscopy. The regular electrolyte (1 M $LiPF_6$ in EC/DMC) with no mGFs fillers had an ionic conductivity of 12.0 mS/cm. The ionic conductivity of shear-thickening electrolytes decreased with the increase of filler loading. For example, the ionic conductivities were 8.3 mS/cm, 8.0 mS/cm, 6.9 mS/cm, 6.2 mS/cm and 5.7 mS/cm for the electrolytes with filler volume fraction of 28.6% to 32.9%, 37.5%, 42.4%, and 47.7%, respectively (see FIG. 2. Part c)).

Rheology tests indicated that the electrolyte showed shear-thickening effect at high shear rate. To further investigate the response of the electrolyte under external impact, impact experiments were conducted. A high-speed camera was used to monitor the transient process of impact. The experiments were conducted under two conditions with the external impact object having different speeds. With the relatively low speed impact, a stainless-steel ball was dropped into a container with electrolytes. The speed of the ball at impact was 1.1 m/s (~4 km/h or 2.5 mph). From the frame sequence images and video collected, it was determined that the impact started at 26 milliseconds (ms) for the regular electrolyte, and the steel ball was nearly immersed entirely at 34 ms. For the shear-thickening electrolyte, the impact started at ~25 ms and the steel ball was stopped at the top surface of the shear-thickening electrolyte and remained there for several seconds. This can be attributed to the increase of the electrolyte viscosity induced by the impact. Four seconds after impact, 50% of the ball volume was still above the shear-thickening electrolyte. After about 28 s, the steel ball slowly immersed into the shear-thickening electrolyte. The phenomenon observed was understandable as the shear-thickening behavior provides resistance force only at high shear rates. When the steel ball loses its momentum, the electrolyte solution returns to its low viscosity state and allows the steel ball to sink into the electrolyte.

In the experiment utilizing high speed impact, a plastic bullet was shot from an airsoft gun with a speed around 79 m/s (284 km/h or 177 mph) at impact. From the frame sequence images and video collected for the regular electrolyte, the bullet directly went through the electrolyte within 0.533 ms and led to a crack in the glass container at 0.600 ms. The container was completely broken after impact. From the frame sequence images and video collected for the shear-thickening electrolyte, the bullet hit the electrolyte surface at 0.533 ms and then was directly bounced back to the air. The shear-thickening electrolyte behaved as a solid-like material preventing the bullet from penetrating the shear-thickening electrolyte. The phenomenon observed could be attributed to the formation of hydroclusters of mGFs in the shear-thickening electrolyte under the dramatic increase of the shear rate generated by the high-speed bullet impact, which confined the Brownian motion of the electrolyte molecules.

In addition to the comparison between a regular liquid electrolyte and a shear-thickening electrolyte of the present invention, electrolytes with unmodified glass fibers were compared with electrolytes having modified glass fibers. In this experiment, the filler volume fraction were 47.7% for both fillers. As expected, the electrolyte with unmodified glass fillers didn't show any resistance to the steel ball dropped at an impact speed of 4.5 m/s. In contrast, the shear-thickening electrolyte exhibited clear resistance at the same impact speed.

Electrochemical Cell Tests

The electrochemical stability of shear-thickening electrolytes of the present invention are critical for their applicability in batteries. Linear scanning voltage tests were performed and the results indicated a comparable electrochemical stability of shear-thickening electrolytes of the present invention with respect to the regular electrolytes. The shear-thickening electrolytes of the present invention were further used in both half-cells and full cells to investigate their stability. For half cells, lithium iron phosphate (LFP) and lithium metal were used as cathodes and anodes, respectively. For full cells, LFP and lithium titanate (LTO) were used as cathodes and anodes, respectively. For both systems, shear-thickening electrolytes and regular electrolytes were used to build cells, following standard LIB fabrication procedures. The half cells were initiated at 0.1 C for two cycles and then cycled again at 0.5 C. The half cells with shear-thickening electrolytes exhibited excellent cyclability, with a capacity retention of 95.2% after 500 cycles and an average coulombic efficiency of 99.2%. The results were better than the results for the half cells made with regular electrolytes, where the capacity retention was 61.1% after 500 cycles. This is probably due to the existence of mGFs in the shear-thickening electrolytes, which may form torturous structures which slows down lithium dendrite growth.

In the full cell test, the cells with shear-thickening electrolytes exhibited a capacity retention of 94.4% after 100 cycles with an average coulombic efficiency of 99.0%. The results are comparable to the cells with regular electrolytes which exhibited a capacity retention of 94.1% after 100 cycles with an average coulombic efficiency of 99.2%. A typical voltage plateau at 3.4V was observed in LFP-Li cells for both the regular and shear-thickening electrolytes. For full cells, a voltage polarization effect was observed along with cycling, which could be attributed to slightly lower conductivity of the shear-thickening electrolytes. Electrochemical tests for electrolytes with unmodified glass fiber fillers were conducted as well. The electrolytes with unmodified glass fiber fillers showed similar performance as the other two electrolytes in full cells with LFP-LTO as electrodes with the capacity retention after 100 cycles being 85.6%, which was only slightly lower than the other two electrolytes. These experiments conclude that the addition of glass fiber fillers to a liquid electrolyte won't change the battery cycle performance significantly. However, by using the modified glass fiber fillers of the present invention, the rheology properties of the electrolyte was changed from shear-thinning to shear-thickening. The impedance spectroscopy of the cells with different electrolytes were obtained after long cycling, wherein the internal resistance of the cells with regular electrolytes, shear-thickening electrolytes, and reference electrolytes with unmodified glass fiber fillers were compared. In all cases, the electrolytes with modified fillers exhibited lower internal resistances. SEM characterizations of the LTO anode after cycling were also carried out. A smoother anode surface was observed for cells with the shear-thickening electrolytes. This phenomenon may be explained because the fillers increased the tortuosity of lithium transport passages, which will benefit the uniform deposition of lithium ions. Therefore, the shear-thickening electrolytes could be a promising replacement for regular electrolytes to provide upgraded safety performance.

Impact Tests

Figure 3:
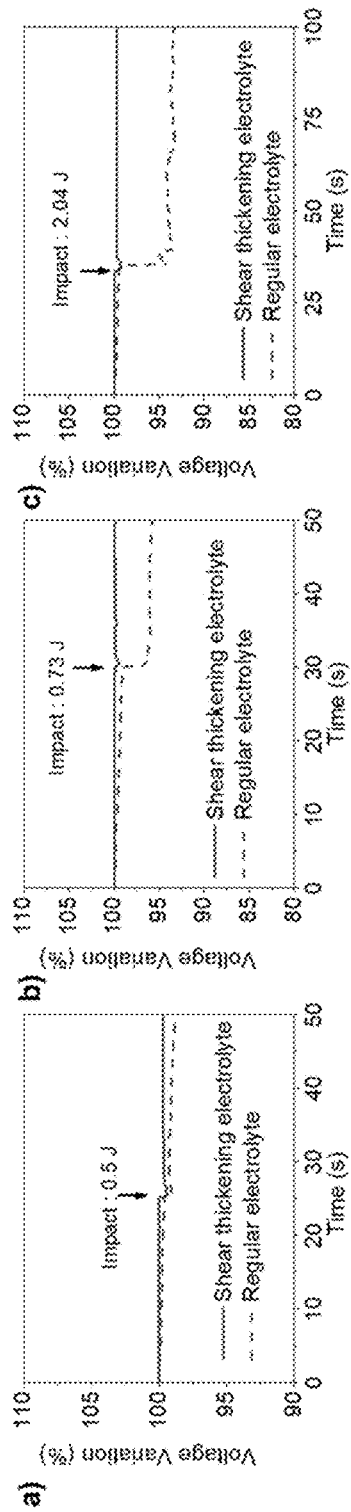
FIG. 3 shows the open circuit voltage stability of cells with shear-thickening electrolyte and regular electrolyte under different impact energy, with part a) showing a 0.5 J impact, part b) showing a 0.73 J impact, and part c) showing a 2.04 J impact.

To further evaluate the impact resistance of the shear-thickening electrolytes of the present invention in use within a battery, LFP-LTO pouch cells with shear-thickening electrolytes were prepared. A stainless steel ball was dropped on a pouch cell from a designed height. The impact energy was calculated based on the weight of the ball and the height from which the ball was dropped. The open circuit voltage (OCV) of the pouch cell was also monitored in real time. As per FIG. 3, part a), when a 0.5 J impact was applied to the cells, only small spikes of OCV were observed, indicating no short circuit under such a small impact. As per FIG. 3, part b), at a 0.73 J impact, the pouch cells with regular electrolytes exhibited a sudden voltage loss (voltage variation: 3.7%), implying a possible internal short circuit between the anode and cathode. In contrast, the cells with shear-thickening electrolytes still exhibited stable voltage. As per FIG. 3, part c), when the impact energy was increased to 2.04 J, a larger voltage drop (6.2%) was observed for cells with regular electrolytes, whereas the cells with shear-thickening electrolyte still maintained a stable voltage. The impact tests of the cells exhibit that an impact-resistance battery can be achieved by using shear-thickening electrolytes of the present invention.

Conclusion

A facile and high yield method has been developed to prepare mGFs based shear-thickening electrolytes. The rheological analysis showed that the electrolytes with varied mGFs loading exhibited adjustable shear-thickening behaviors. Shear-thickening behavior was observed at a volume fraction as low as 28.6%. The transient behaviors of the shear-thickening electrolytes under impact was recorded with a high-speed camera and the results revealed the impact-resistance nature of the shear-thickening electrolytes. Cycling tests of Li-LFP and LTO-LFP cells equipped with the shear-thickening electrolytes were performed. The cells exhibited excellent cyclability with a capacity retention of 95.2% after 500 cycles for Li-LFP half cells and 94.4% after 100 cycles for LTO-LFP full cells. Impact tests were further applied on pouch cells and the OCVs of cells with shear-thickening electrolytes were significantly more stable than the OCVs of cells with regular electrolytes. The excellent electrochemical stability and impact-resistance nature of the shear-thickening electrolytes of the present invention could enable the shear-thickening electrolytes to be used as a potential candidate to replace the commercial electrolyte so as to be able to protect batteries from short circuits under severe impact.

Preparation of APTES Modified Hollow Silica Nanotubes

Synthesis of Silica Nanotubes:

7.5 ml cyclohexane, 4.25 g Brij C10 was first mixed and heated up to 50° C. Subsequently, 1 ml of 0.8 M NiCl2 solution was added dropwise. After thorough mixing, 0.225 ml hydrazine monohydrate was added into the mixture to form nickel-hydrazine nanorod template. After stirring for 3 hours, 500 μl of diethylamine and 1.5 mL of TEOS were introduced for silica coating and kept stirring for another 2 h to form silica-coated nickel nanorod. The product was collected by centrifugation and washed with isopropanol. To remove the nickel-hydrazine nanorod template, the product was immersed in 100 ml of 1M HCl and stirred for 1 h. After removal of the nickel-hydrazine template, a hollow silica nanotube remains. The final product was collected by centrifugation and washed with water.

Functionalization of Silica Hollow Rod:

1 g the silica hollow rod was first added to 3 ml of anhydrous toluene to form a suspension. Subsequently, 0.4 ml APTES was added and kept stirring at 70° C. overnight. The suspension was then washed with methanol for three times via centrifugation. The sediment was collected and dried at 80° C. for 5 h to receive 1.2 g APTES-modified silica hollow rod.

In light of the foregoing, it should be appreciated that the present invention significantly advances the art by providing a shear-thickening impact resistant electrolyte that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

The invention claimed is:

1. A shear-thickening electrolyte solution comprising:
a carbonate-based polar solvent;
a lithium-based salt electrolyte dissolved in said carbonate-based polar solvent; and
a hollow ceramic filler dispersed in said carbonate-based polar solvent, said hollow ceramic filler having an aspect ratio, length to width, of greater than 5:1 and being functionalized to provide terminal end groups that interact with the carbonate-based polar solvent to form a solvation layer around said hollow ceramic filler and support the suspension of said hollow ceramic filler in said carbonate-based polar solvent; wherein hollow ceramic filler is selected from the group consisting of glass, silica, $CaCO_3$, $MoS_2$, graphene and its derivatives, $Al_2O_3$, BN and its derivatives, and combinations thereof; and wherein the ionic conductivity of the shear-thickening electrolyte solution is from 5 mS/cm to 20 mS/cm.

2. The shear-thickening electrolyte solution of claim 1, wherein the hollow ceramic filler is functionalized by reaction with a functionalizer of Formula 1:

$$R^1{}_n\text{—Si—}R^2\text{—}R^3 \qquad \text{Formula 1}$$

wherein $R^1$ is an alkoxy end group, n is a numeral from 1 to 3, $R^2$ is a carbon chain containing from 3 to 24 carbons, and $R^3$ is a polar terminal end group.

3. The shear-thickening electrolyte solution of claim 2, wherein $R^2$ is a carbon chain containing from 3 to 6 carbons.

4. The shear-thickening electrolyte solution of claim 2, wherein Formula 1 is (3-aminopropyl) triethoxysilane.

5. The shear-thickening electrolyte solution of claim 1, wherein the aspect ratio is between 5:1 and 10:1.

6. The shear-thickening electrolyte solution of claim 1, wherein the volume fraction of functionalized hollow ceramic filler in the shear-thickening composition is 5% or greater.

7. The shear-thickening electrolyte solution of claim 1, wherein the volume fraction of functionalized hollow ceramic filler in the shear-thickening composition is 20% or greater.

8. The shear-thickening electrolyte solution of claim 1, wherein the hollow ceramic filler is present in the shear-thickening composition at a volume fraction of from 1% or more and 50% or less.

9. The shear-thickening electrolyte solution of claim 1, wherein the carbonate-based polar solvent is selected from the group consisting of ethylene carbonate, dimethyl carbonate, ethylmethyl carbonate, propylene carbonate and mixtures thereof.

10. The shear-thickening electrolyte solution of claim 9, wherein the lithium-based salt electrolyte is selected from the group consisting of lithium hexafluorophosphate ($LiPF_6$), lithium bis(oxalato)borate, lithium bis(trifluoromethanesulfonyl)imide, and mixtures thereof.

* * * * *